United States Patent

Robbins, III

[11] Patent Number: 5,489,049
[45] Date of Patent: Feb. 6, 1996

[54] DISPENSING CAP WITH ROTATABLE TOP

[76] Inventor: Edward S. Robbins, III, 2802 E. Avalon Ave., Muscle Shoals, Ala. 35661

[21] Appl. No.: 340,853

[22] Filed: Nov. 15, 1994

Related U.S. Application Data

[63] Continuation of Ser. No. 76,132, Jun. 14, 1993, Pat. No. 5,411,186, which is a continuation-in-part of Ser. No. 47,086, Apr. 16, 1993, abandoned, which is a continuation-in-part of Ser. No. 979,042, Nov. 19, 1992, abandoned.

[51] Int. Cl.$^6$ ............................................. G01F 11/28
[52] U.S. Cl. .................... 222/448; 222/158; 222/456; 222/481; 222/553
[58] Field of Search .................... 222/23, 142.4, 222/142.5, 157, 158, 424.5, 425, 442, 448, 454, 456, 480, 481, 553, 561

[56] References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard . | |
| 2,214,437 | 9/1940 | Punte et al. | 206/42 |
| 2,370,820 | 3/1945 | Stott | 222/456 |
| 2,449,285 | 9/1948 | Ekstrom | 222/548 |
| 2,784,884 | 3/1957 | Borie, Jr. | 222/336 |
| 2,804,103 | 8/1957 | Wall | 141/381 |
| 2,811,281 | 10/1957 | Donovan | 222/81 |
| 2,840,124 | 6/1958 | Greene | 141/381 |
| 2,844,266 | 7/1958 | Hofe | 215/64 |
| 2,969,167 | 1/1961 | Libit | 222/561 |
| 2,985,343 | 5/1961 | Mask | 222/442 |
| 3,020,659 | 2/1962 | Paulini | 40/307 |
| 3,033,420 | 5/1962 | Thomas et al. | 222/1 |
| 3,140,799 | 7/1964 | Mehr | 222/131 |
| 3,424,355 | 1/1969 | Blumen | 222/450 |
| 3,486,665 | 12/1969 | La Croce | 222/480 |
| 3,860,111 | 1/1975 | Thompson | 206/534 |
| 3,948,105 | 4/1976 | Johnson, Jr. | 73/427 |
| 4,069,935 | 1/1978 | Hampel | 215/203 |
| 4,079,859 | 3/1978 | Jennings | 222/454 X |
| 4,083,467 | 4/1978 | Mullins et al. | 220/90.4 |
| 4,144,989 | 3/1979 | Joy | 222/438 |
| 4,164,301 | 8/1979 | Thayer | 220/253 |
| 4,292,846 | 10/1981 | Barnett | 73/427 |
| 4,298,038 | 11/1981 | Jennings | 222/454 X |
| 4,318,500 | 3/1982 | Melikian | 222/561 X |
| 4,346,823 | 8/1982 | Eppenbach | 222/456 X |
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |

(List continued on next page.)

FOREIGN PATENT DOCUMENTS

| | | | |
|---|---|---|---|
| 580338 | 8/1958 | Italy | 222/553 |
| 613958 | 12/1960 | Italy | 222/553 |

*Primary Examiner*—Andres Kashnikow
*Assistant Examiner*—Joseph A. Kaufman
*Attorney, Agent, or Firm*—Nixon & Vanderhye

[57] ABSTRACT

A dispenser cap for discharging measured amounts of contents from a container includes a first peripheral skirt having upper and lower portions, the lower portion serving to secure the cap to a container. The upper skirt portion at least partially defines a dispensing chamber primarily in the upper portion of the first peripheral skirt, as further defined by a weir panel, the weir panel configured to provide a weir opening between the upper and lower cap skirt portions. A top for the cap includes a second peripheral skirt telescoped over and secured to the first peripheral skirt, wherein the first and second peripheral skirts have alignable first and second respective discharge apertures formed therein. The first discharge aperture in the first peripheral skirt is diametrically opposed to the weir opening so that additional container contents are not spilled into the dispensing chamber during dispensing of the measured amount.

8 Claims, 3 Drawing Sheets

U.S. PATENT DOCUMENTS

| | | | |
|---|---|---|---|
| 4,691,821 | 8/1987 | Hofmann | 206/216 |
| 4,693,399 | 9/1987 | Hickman et al. | 222/480 |
| 4,714,181 | 12/1987 | Kozlowski et al. | 222/480 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/243 |
| 5,139,181 | 8/1992 | VerWeyst | 222/480 |

DISPENSING CAP WITH ROTATABLE TOP

RELATED APPLICATIONS

This application is a continuation of application Ser. No. 08/076,132 filed Jun. 14, 1993, now U.S. Pat. No. 5,411,186, which is a continuation-in-part of commonly owned, application Ser. No. 08/047,086 filed Apr. 16, 1993 now abandoned which is a continuation-in-part of application Ser. No. 07/979,042 filed Nov. 19, 1992 now abandoned.

BACKGROUND AND SUMMARY OF THE INVENTION

The present invention relates generally to dispensing containers, and more specifically, to dispensing cap constructions enabling accurately measured amounts of the container contents to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

Another example relates to liquid detergent dispensers where the cap is designed with a built-in cup, which can be used upon removal and inversion of the cap.

The present invention eliminates the need for measuring spoons or cups, and/or the requirement for removal of the cap before using it as a measuring device by providing a hollow cap with its own measuring chamber. While the incorporation of a measuring function into a container/cap construction for the discharge of desired amounts of the container contents is not new (see for example, U.S. Pat. Nos. 1,802,284; 2,804,103; 3,860,111; 4,613,057 and 4,635,828), the present invention provides improved and simplified structures for accomplishing this result. This continuation-in-part application discloses additional embodiments of a dispensing cap which are particularly useful with liquid detergents and/or other somewhat viscous liquids.

In a first exemplary embodiment of the invention in accordance with this continuation-in-part application, a transparent plastic cap is provided which includes a top and a depending skirt, wherein the top is rotatable relative to the skirt. The skirt is divided into upper and lower portions by an internal partition or weir panel which also defines a weir opening lying on ode side of a centerline extending across the cap. The weir panel, in combination with the skirt and the rotatable top, combine to form a measuring chamber into which a desired amount of container contents may be poured via the weir opening.

The rotatable top of the cap is formed with its own depending skirt which terminates at a radially inwardly directed annular rib which is adapted to seat within an annular groove in the upper skirt portion of the cap. In this way, the top may be rotated about a longitudinal axis of the cap. The top skirt and the upper end of the cap skirt are provided with discharge apertures which may be aligned via rotation of the top. At the same time, diametrically opposed locations, the top skirt and the cap skirt are provided with vent apertures which may be aligned simultaneously with the discharge apertures. By this construction, the container contents which have been poured into the measuring chamber can be discharged from the cap by alignment of the respective discharge apertures in the skirt and top as described above.

In accordance with another feature of the invention, the weir panel which defines in part the volumetric measuring chamber, may be inclined from the weir opening upwardly towards the discharge aperture to facilitate discharge of the measured amount.

In another exemplary embodiment of the invention, a shaft extends from the top of the cap downwardly to a bearing recess within the weir panel. Attached to the shaft, there is a paddle having a size and shape sufficient to cover the weir aperture. This paddle is located in diametrically opposed relationship to the discharge aperture in the top skirt. By this arrangement, the weir aperture will be closed when the discharge aperture is open, and vice versa. It will be appreciated that by closing the weir opening or aperture, any undesirable addition of container contents in the dispensing or measuring chamber is precluded during dispensing of the measured amount.

It is another feature of this invention, that a detent and groove arrangement be provided where the discharge apertures in the top skirt and the cap skirt align to provide a good indication of alignment to the user.

In still other exemplary embodiments invention, a unique slide gate is utilized for the purpose of opening and closing the dispensing aperture within the cap. This slide gate functions in much the same manner as the rotatable top skirt described above, but is designed to reciprocate axially within a slot provided in the cap skirt as described in further detail hereinbelow.

Thus, in its broader aspects, the present invention relates to a dispenser cap for discharging measured amounts of contents from a container comprising a first peripheral skirt having upper and lower portions, the lower portion provided with interior surface means for securing the cap to a container, the upper portion at least partially defining a dispensing chamber, wherein the upper and lower portions of the first peripheral skirt are separated by a weir panel, the weir panel configured to provide a weir opening between the upper and lower portions; and a top including a second peripheral skirt telescoped over and secured to the first peripheral skirt, wherein the first and second peripheral skirts have alignable first and second respective discharge apertures formed therein, the first discharge aperture in the first peripheral skirt diametrically opposed to the weir opening.

In another aspect, the invention relates to a container and dispensing cap assembly for discharging measured amounts of contents from the container, the assembly comprising a container having an open upper end; a dispenser cap removably secured to the open upper end, the dispenser cap formed with a dispensing chamber therein, the chamber having a first opening at thereof to permit a measured amount of contents of the container to pass into the chamber, the chamber having second opening at an upper end thereof to permit the measured amount to be discharged from the cap, wherein rotatable means are provided for opening and closing the second opening.

In still another aspect, the invention relates to a dispenser cap for discharging measured amounts of contents from a container comprising a top wall and a peripheral skirt depending from the top wall, the depending skirt having upper and lower portions, the lower portion provided with means for securing the cap to a container, the upper portion defining a dispensing chamber, wherein the upper and lower portions are separated by a weir panel, the weir panel configured to provide a weir opening between the upper and lower portions, and wherein a discharge aperture is provided in the upper skirt portion diametrically opposed to the weir opening and further wherein axially reciprocating means are provided for opening and closing the dispensing aperture.

The invention as described herein provides a simple, easy-to-use and low cost dispensing cap which enables a user to dispense measured amounts of container contents from the cap without the need for additional utensils, and without having to first remove the cap.

Other advantages of the subject invention will become apparent from the detailed description which follows.

DESCRIPTION OF THE DRAWINGS

Figure 1:
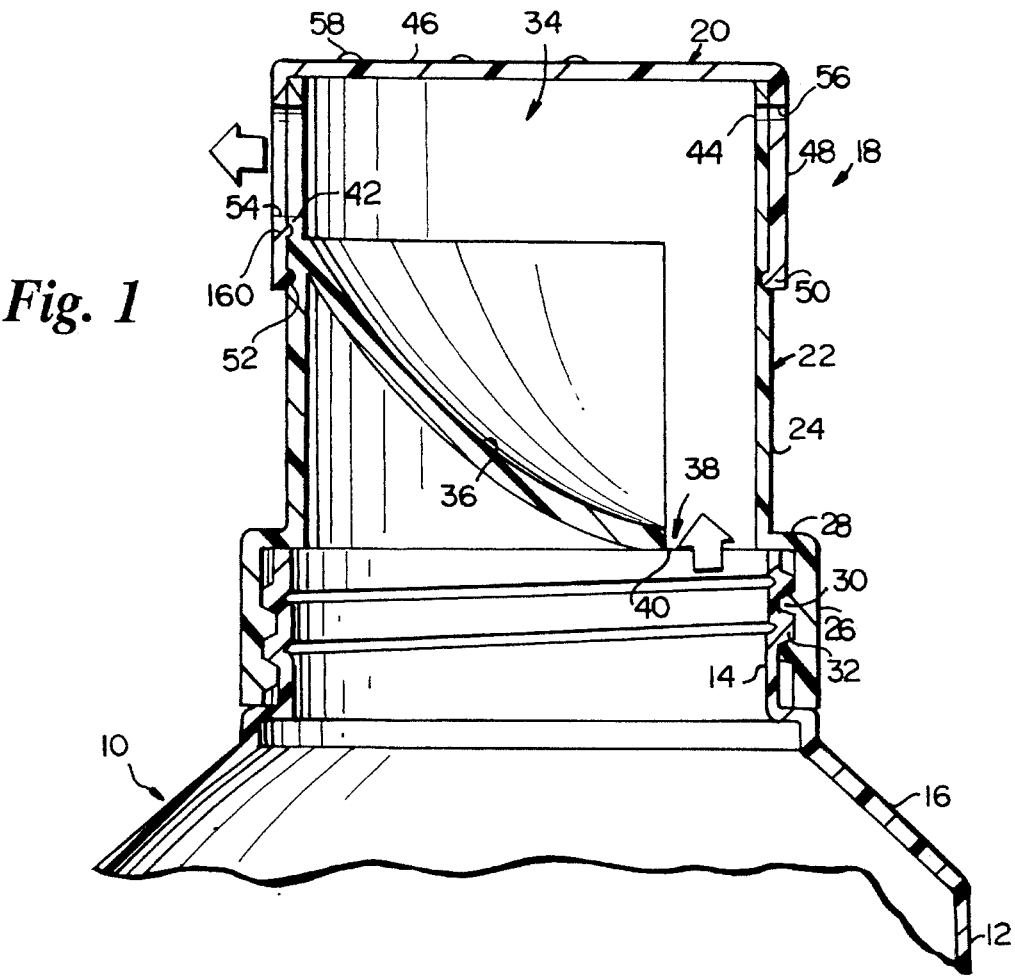
FIG. 1 is a part section view of a container and dispensing cap in accordance with one exemplary embodiment of the invention.

With reference now to FIG. 1, a conventional container 10 (which may be plastic, glass or other material) includes a peripheral side wall portion 12 extending upwardly from a bottom wall (not shown), and terminating in an externally threaded upper open end 14. For relatively small discharge openings, it will be appreciated that the peripheral side wall may be connected to the upstanding open end 14 by means of a tapered neck or shoulder section 16. The upstanding threaded portion 14 typically receives a conventional closure which, as described below, is replaced by the unique dispenser cap 18 in accordance with this invention.

The container 10 may include powdered or liquid contents which may be any of a variety of substances characterized broadly as detergents, but it should be understood that the container and cap construction in accordance with this invention is equally suitable for use with other powder and/or liquid materials which are to be dispensed in measured quantities.

The measuring/dispensing cap 18 as shown in FIG. 1 is preferably made of transparent plastic material, and includes a discrete top 20 and a peripheral skirt 22 which is divided into upper and lower sections 24, 26, respectively, by an annular stepped shoulder 28. The lower skirt portion 26 is provided with an internal screw thread 30 which is adapted to cooperate with an external thread 32 on the upstanding dispensing portion 14 of the container 10 in the manner of a typical threaded closure.

A volumetric space or chamber 34, from which measured amounts of contents can be dispensed, is defined in part by a portion of the upper section 24 of the cap skirt 22, the discrete top 20, and a curved weir panel 36 which may be formed integrally with the cap skirt 22. The weir panel 36 forms an essentially irregularly shaped funnel which is formed at its lowermost end so as to provide a weir opening or aperture 38 which is defined by the arcuate periphery of the cap skirt 22 adjacent the shoulder 28, and by a straight weir edge 40, to thus impart to the aperture 38 a substantially chordal shape.

In the upper section 24 of the cap skirt 22, and at a diametrically spaced location vis-a-vis the aperture 38, there is provided a circular discharge aperture 42. In addition, diametrically opposed to the aperture 42 there is provided a smaller vent aperture 44.

The top 20 is formed with a solid, flat top surface 46 and a downwardly extending top skirt 48. In this regard, reference is made herein consistently to the "cap skirt 22" which is the main peripheral portion of the cap 18, and to the "top skirt 48" which is simply that peripheral portion of the top 20 which depends from the flat top surface 46 and which telescopes over the cap skirt. The lowermost edge of the top skirt 48 is formed with a radially inwardly extending shoulder 50 adapted to seat within a corresponding groove 52 formed in the cap skirt 22 so as to releasably hold the top 20 to the cap skirt 22 in such a way that the top 20 is rotatable relative to the cap skirt 22. It is further pointed out that the top skirt 48 is provided with a discharge aperture 54 having a shape substantially identical to that of discharge aperture 42 in the cap skirt 22. In addition, a vent aperture 56 is also provided in the top skirt 48 in diametrically opposed relationship to the discharge aperture 54. By this arrangement, it should be apparent that apertures 42 and 54 are readily alignable, as are vent apertures 44 and 56, by means of rotation of the top 20 relative to the cap skirt 22. The aligned orientation of the apertures is illustrated in FIG. 1.

The top wall surface 46, which is also preferably constructed of clear plastic material, may be provided with integral or printed volumetric indicators or gradations 58 so as to indicate to the user the amount of powder or liquid within the chamber 34.

In use, with the top 20 rotated in such a way as to close off the discharge aperture 42 and vent aperture 44, the container is tilted (to the left as viewed in FIG. 1) so that contents spill over the weir panel 36, through the weir aperture 38 and into the chamber 34 as indicated by the arrow within the aperture 38. With the container 10 held essentially horizontally, the user may determine exactly how much of the container contents are within the chamber 34 with the assistance of indicators 58. When the desired amount of contents have been transferred to the chamber 34, the container 10 may be tilted back toward the right (as viewed in FIG. 1) such that liquid contents within the container are prevented from overflowing the weir panel 36, but tilted sufficiently to retain desired dispensing amount within the chamber 34. The 20 may then be rotated to align the discharge apertures 42 and 54 and vent apertures 44 and 56 thereby permitting the desired volumetric amount of contents to be dispensed from the cap, as indicated by the arrow adjacent the aligned apertures 42, 54. It will be appreciated that by sloping the weir panel from the weir aperture 38 to a level adjacent the discharge apertures 42, 54, the dispensing of the measured amount is enhanced in that the container itself need not be tilted to the same degree as otherwise necessary if the weir panel 36 were horizontal, i.e., parallel to top surface 46, and perpendicular to a longitudinal axis of the cap. As a result, it is even less likely that any additional container contents will spill over the weir edge 40 during dispensing of the measured amount through apertures 42, 54.

As a further feature of the invention, a detent/recess arrangement may be provided between the top skirt 48 and the cap skirt 22, as shown at 60 in FIG. 1, so as to provide the user with a good indication or feel when the discharge and vent apertures are in the aligned and open position. Alternatively, the circumferential extent of shoulder 50 and groove 52 can be adapted to emit rotation of the top 20 relative to the skirt 22 to, for example, 90°. In this way, positive stops are provided for both the closed and open positions.

Figure 2:
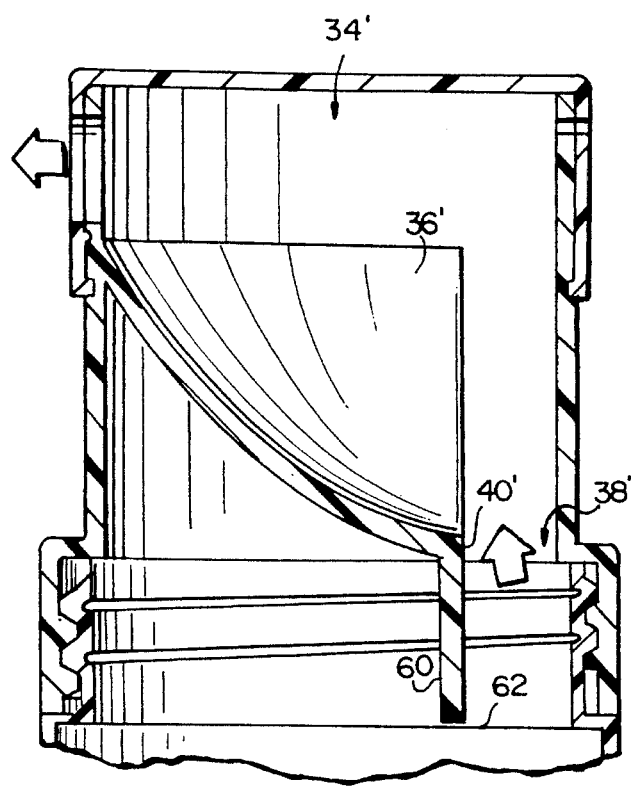
FIG. 2 is a part section showing a variation of the dispensing cap construction shown in FIG. 1.

With reference now to FIG. 2, an alternative or modified version of the embodiment illustrated in FIG. 1 includes a deflector plate 61 which depends from the straight edge 40' of the weir aperture 38', and serves to effectively prevent unwanted container contents from spilling over the weir edge 40' at a given tilt angle of the container 10. In other words, the deflector plate 61 establishes a new, lower weir edge 62 which will tend to trap container contents behind the panel 36' when the container is oriented to dispense measured amounts from the chamber 34'.

Figure 3:
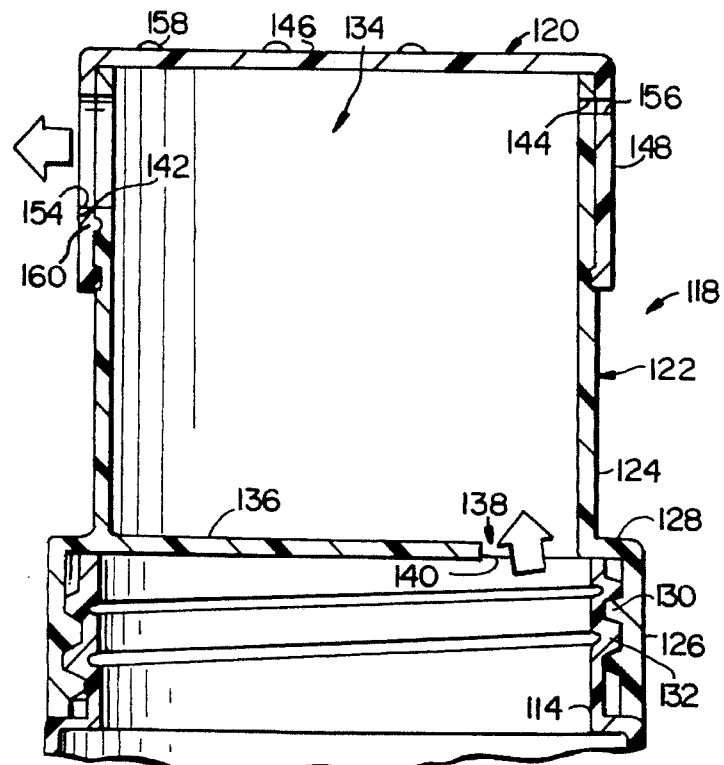
FIG. 3 is a part section of a container and dispensing cap in accordance with another exemplary embodiment of the invention.

With reference now to FIG. 3, another embodiment of the invention is shown and, for convenience, reference numerals similar to those used to describe similar or common elements in the embodiment shown in FIG. 1 are employed but with the prefix "1" added.

The dispenser cap 118 is formed with a discrete top 120 which is rotatable relative to the cap skirt 122. The cap skirt 122 includes an upper portion 124 and a lower portion 126 separated by an annular horizontal shoulder 128. The lower skirt portion 126 is provided with an internal screw thread 130 designed to cooperate with the external thread 132 on the upstanding open end 114 of the container 110 in the usual manner.

The upper portion of the dispensing cap 118 is formed to provide a volumetric chamber 134 which is defined by the upper portion 124 of the cap skirt 122, the flat top surface 146 of the discrete top 120, and an internal weir panel 136 which lies horizontally adjacent the annular shoulder 128. The weir panel 136 forms a chord-shaped weir opening or aperture 138 which allows contents of the container to be transferred from the body of the container 110 into the measuring chamber 134. With the exception of the substantially horizontal weir panel 136 (as opposed to the inclined weir panel 36 of the FIG. 1 embodiment), the dispensing caps 18 and 118 are substantially identical. Thus, the construction of the rotatable top 120 and the interaction between apertures 142, 154, 144 and 156 need not be described further herein. The manner of operation of the cap is also similar to that described hereinabove with respect to the FIG. 1 embodiment. As already explained above, the sloped weir panel 36 of FIG. 1 is preferred insofar as the contents within the chamber 34 are more easily discharged through the apertures 54 and 42 than with the configuration illustrated in FIG. 3.

Figure 4:
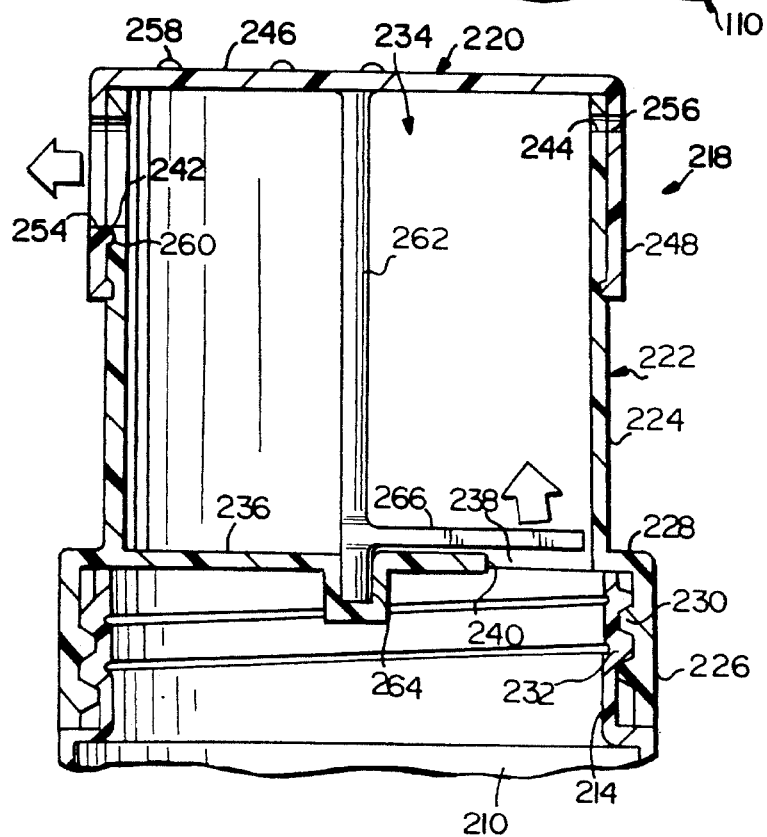
FIG. 4 is a part section of a container anti dispensing cap in accordance with still another exemplary embodiment of the invention.

Turning now to FIG. 4, another (less preferred) embodiment of the subject invention is disclosed and, again for convenience, similar reference numerals are used to denote similar or common elements of the cap, but with a prefix "2" added.

Figure 5:
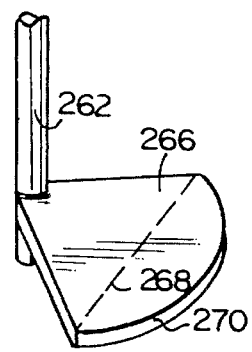
FIG. 5 is a perspective view partially showing a component of the cap illustrated in FIG. 4.

The distinction between the embodiment illustrated in FIGS. 3 and 4 lies in the provision for an element to close the weir opening 238 when contents within the chamber 234 are being discharged through the apertures 242, 254. In order to accomplish this, the top 220 is provided with a central shaft 262 (connected to the top 220 by means of a key, for example, to insure rotation of the shaft when the top is rotated) which extends between the top wall surface 246 and the weir panel 236. Within the weir panel 236, there is provided a pivot bearing recess 264 for receiving the shaft 262. At the lower end of the shaft 262, there is provided a paddle 266 which may be integral with the shaft 262 or attached thereto as a separate piece. The paddle 266, as best seen in FIG. 5, defines a segment of a circle and is sized so as to be able to close off the weir aperture 238 when the paddle 266 overlies the aperture. In this regard, the dashed line 268 in FIG. 5 represents the weir edge 240, so that the chord-shaped segment of paddle 266 defined by line 268 and the paddle edge 270 may overlie (and close) the similarly shaped weir opening 238. It should be further noted that the paddle 266 is diametrically opposed to the discharge orifice 254 in the top skirt 248 so that, when the apertures 242 and 254 are in alignment for discharging contents from the chamber 234, the paddle 266 positively closes the weir aperture 238, thus preventing any container contents from entering into the volumetric dispensing chamber 234 when the apertures 242 and 254 are aligned in an open position.

Figure 6:
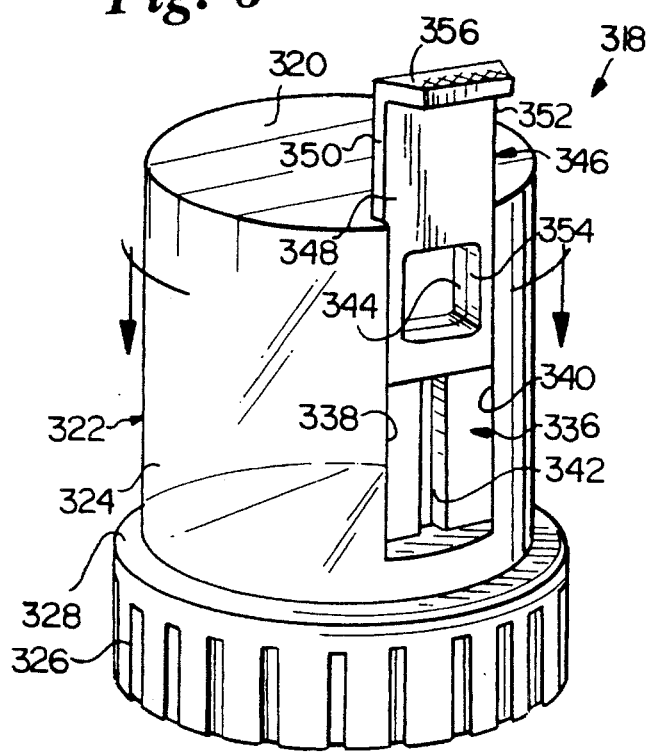
FIG. 6 is a perspective view of a dispensing cap in accordance with a fourth exemplary embodiment of the invention, showing a slide gate in an open position.
Figure 7:
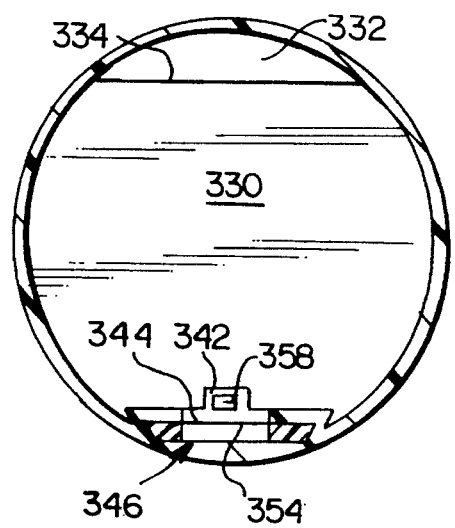
FIG. 7 is a cross section of the dispensing cap illustrated in FIG. 6, taken along the line 7—7.

With reference now to FIGS. 6 and 7, another embodiment of the invention is illustrated which incorporates the same principals of the earlier described embodiments in terms of a volumetric dispensing chamber defined in part by a weir panel, but which utilizes a unique slide gate for dispensing the container contents from the measuring chamber. Specifically, the measuring/dispensing cap 318 as shown in FIG. 6 (preferably also made of clear plastic material), includes an integral top wall 320 and a depending peripheral skirt 322 which is divided into upper and lower sections 324, 326, respectively, by an annular stepped shoulder 328. The lower skirt portion 326 is provided with an internal screw thread (not shown) which is adapted to cooperate with an external thread on an upstanding dispensing portion of an associated container in the manner of a typical threaded closure, and in the manner described hereinabove with respect to the embodiments illustrated in FIGS. 1–5.

Here again, a volumetric space or measuring chamber from which measured amounts of contents can be dispensed, is defined by the upper skirt section 324, the cap top wall 320, and a planar weir panel 330 located adjacent the annular shoulder 328. The weir panel 330, best seen in FIG. 7, is similar to that described hereinabove with respect to the embodiment illustrated in FIG. 3, and includes a weir opening 332 defined by a portion of the arcuate periphery of the cap skirt and by a straight weir edge 334, to thus impart to the opening 332 a substantially chordal shape.

An elongated slot or recess 336 is formed in the upper skirt section 324 and extends axially from the top wall 320 to a location just above the annular shoulder 328. The slot 336 is defined in part by longitudinal of axial side edges 338, 340 which are angled so as to create dovetail type grooves. A groove or track 342 is also provided centrally of the slot or recess 336, extending parallel to the edges 338, 340. The track 342 is interrupted by a discharge aperture 344 formed in the base of the slot or recess 336 and from which the measured container contents are dispensed.

A slide gate 346, having a substantially rectangular shape, is adapted to slide within the slot 336 and, in this regard, the main body portion 348 of the slide gate is provided with longitudinal edges 350, 352 which are beveled to fit within the dovetail grooves 338, 340. The lower portion of the slide gate 346 is provided with a discharge aperture 354 which is of substantially the same size and shape as the discharge aperture 344. The upper portion of the slide gate is provided with a gripping ledge or tab 356 which extends substantially perpendicularly to the main body portion 348 end may, if desired, include a knurled pattern thereon to facilitate movement of the slide gate within the slot 336. The back side of the slide gate 346 is provided with a central, longitudinally extending rib 358 which is adapted to slide within the groove 342.

It will be appreciated that when the slide gate is pushed downwardly within the slot 336 to its lowermost position, the upper solid portion of the slide gate will close off the aperture 344. The slide gate will be in this position when the container is tilted in order to transfer a measured amount of container contents into the measuring chamber in the upper portion of the cap 318. As in the previously described embodiments, it is noted that the weir opening 332 is diametrically opposed to the discharge apertures 344, 354, so that the measured amount can be dispensed from the cap without additional undesired container contents spilling over the weir edge 334 and into the measuring chamber. Once the measured amount has been transferred to the measuring chamber within the dispensing cap 318, the container is then tilted in the other or opposite direction and the slide gate 346 moved upwardly to the position illustrated in FIG. 6, with apertures 344 and 354 in substantial alignment. The measured amount can then be easily dispensed from the cap. A detent arrangement similar to that described above in connection with the FIG. 1 embodiment may be incorporated into the slide gate/slot construction.

Figure 8:
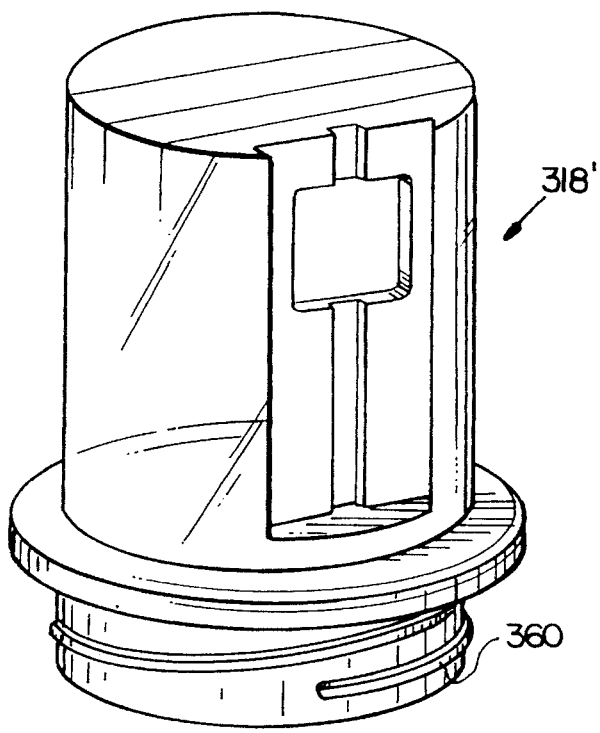
FIG. 8 is a perspective view of a dispensing cap in accordance with a fifth exemplary embodiment of the invention, and with the slide gate removed for ease of understanding.

With reference now to FIG. 8, a variation of the dispensing cap illustrated in FIG. 6 is shown to include external screw threads 360 rather than the internal threads provided on the embodiment illustrated in FIG. 6. The slide gate for the cap 318' illustrated in FIG. 8 has been omitted simply for the sake of clarity and ease of understanding vis-a-vis the construction of the cap itself. The cap 318' otherwise is utilized in the same manner as the cap 318 illustrated in FIG. 6.

The embodiments illustrated in FIGS. 6 and 8, like the other previously described embodiments, may be provided with volumetric indicia 362 which may take the form of integral ribs provided in the clear plastic material. Printed indicia may be used.

In the variously disclosed embodiments, the dispensing caps have been shown to include screw threads for attachment to the threaded open upper end of the container. It will be appreciated that the improved features of this invention are equally applicable to snap-on caps. In addition, while the weir panels 36, 136 and 236 have been shown to be integral with the respective cap skirts, they may also be formed separately. Similarly, the upper and lower portions of the cap skirts 22, 122 and 222 may also be formed separately.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements in addition to those expressly discussed above which are nevertheless within the spirit and scope of the appended claims.

What is claimed is:

1. A container and dispensing cap assembly for discharging measured amounts of contents from the container, the assembly comprising:

a container having an open upper end;

a dispenser cap removably secured to said open upper end, said dispenser cap having a rotatable top and peripheral skirt formed with a dispensing chamber therein, said chamber having a first opening at a lower end thereof to permit a measured amount of contents of the container to pass into said chamber, said first opening defined in part by a straight edge of a weir panel and in part by said peripheral skirt, said straight edge extending horizontally between peripherally spaced locations on said peripheral skirt, said chamber having a second opening at an upper end of said peripheral skirt and substantially diametrically opposite to said first opening to permit said measured amount to be discharged from said cap, and wherein said rotatable top is provided with means for opening and closing said second opening.

2. The assembly of claim 1 wherein said weir panel is inclined between said first and second openings.

3. The assembly of claim 1 wherein said weir panel is arranged substantially perpendicular to a longitudinal axis of the cap.

4. The assembly of claim 1 wherein volumetric indicia are provided on said rotatable means.

5. The assembly of claim 1 wherein said top includes a second peripheral skirt telescoped over said first peripheral skirt.

6. The assembly of claim 5 wherein said second opening is formed in said first peripheral skirt and further wherein a third opening is formed in said second peripheral skirt and is adapted for alignment with said second opening upon rotation of said top relative to said first peripheral skirt.

7. A dispenser cap for discharging measured amounts of contents from a container comprising:

a top wall and a substantially cylindrical peripheral skirt depending from the top wall, said skirt having upper and lower substantially cylindrical portions, the lower portion provided with means for securing the cap to a container, the upper substantially cylindrical portion defining a dispensing chamber, wherein the upper and lower substantially cylindrical portions are separated by a planar weir panel, the weir panel configured to provide a weir opening between the upper and lower substantially cylindrical portions, said weir opening defined by a straight weir edge of said panel and a portion of said substantially cylindrical peripheral skirt, said straight weir edge extending horizontally between circumferentially spaced locations on said peripheral skirt, and wherein a discharge aperture is provided in the upper skirt portion diametrically opposed to said weir opening and further wherein an axially reciprocating slide gate is provided in said substantially cylindrical peripheral skirt for opening and closing said discharge aperture.

8. The dispenser cap of claim 7 wherein said slide gate has an aperture therein which is alignable with the dispensing aperture in the skirt.

* * * * *